United States Patent [19]
Solondz

[11] Patent Number: 5,615,249
[45] Date of Patent: Mar. 25, 1997

[54] SERVICE PRIORITIZATION IN A CELLULAR TELEPHONE SYSTEM

[75] Inventor: Max A. Solondz, Madison, N.J.

[73] Assignee: Lucent Technologies Inc., Murray Hill, N.J.

[21] Appl. No.: 346,805

[22] Filed: Nov. 30, 1994

[51] Int. Cl.$^6$ ............................................. H04Q 7/32
[52] U.S. Cl. .................... 379/58; 455/33.1; 455/58.1
[58] Field of Search .................... 379/58, 59, 60, 379/61, 62, 63; 455/33.1, 33.2, 54.1, 54.2, 58.1, 58.2; 340/825.5

[56] References Cited

U.S. PATENT DOCUMENTS

| Re. 32,789 | 11/1988 | Lynks, Jr. et al. | 379/58 |
|---|---|---|---|
| 5,025,254 | 6/1991 | Hess | 379/62 |
| 5,226,071 | 7/1993 | Bolliger et al. | |
| 5,301,356 | 4/1994 | Bodin et al. | 455/33.2 |
| 5,329,578 | 7/1994 | Brennan et al. | 379/67 |

OTHER PUBLICATIONS

Motorola "System Saber", 1990, p. 4.

*Primary Examiner*—Curtis Kuntz
*Assistant Examiner*—Lisa M. Coward

[57] ABSTRACT

A system for servicing call establishment requests in a cellular telephone system on a priority basis is described. In this system, a base station receives a call establishment request either via an external MTSO (mobile telephone switch office) or PSTN (public telephone switch network), or internally from a call establishment request, broadcasted by a mobile unit associated with a first subscriber within the cell of interest. Both the base station and the mobile unit are located in a cell (i.e., the cell of interest) of the cellular telephone system. The base station determines whether it has a free channel to service the call establishment request. If the base station does not have a free channel to service the call establishment request, then a call processor determines a service priority level of the first subscriber. This service priority level is communicated to the base station. The base station processes the call establishment request in accordance with the service priority level of the first subscriber and service priority levels of second subscribers that are involved in telephone calls active in the cell.

11 Claims, 4 Drawing Sheets

SERVICE PRIORITIZATION IN A CELLULAR TELEPHONE SYSTEM

BACKGROUND OF THE INVENTION

1. Field of the Invention

The present invention relates generally to cellular telephone systems, and more particularly to a system and method of implementing service prioritization in cellular telephone systems.

2. Related Art

In conventional cellular telephone systems, call requests (which are issued to establish new telephone calls) are serviced on a first-come, first-served basis. Call requests are not prioritized based on any customer-specific criteria (such as a customer's service plan or per-call choice). It is noted that some special types of calls, such as emergency "911" calls, are serviced on a priority basis. However, the priority service granted to such calls is not based on any customer-specific criteria.

As will be appreciated, cellular telephone systems have a finite service capacity. New calls cannot be accepted if this service capacity is reached. Since call requests are serviced on a first-come, first-served basis, callers will often be denied service simply because their call requests were issued later in time than others. Clearly, the current methodology for processing call requests is arbitrary and inflexible.

Thus, what is required is an improved, flexible system and method for processing call requests in a cellular telephone system.

SUMMARY OF THE INVENTION

Briefly stated, the present invention is directed to a system and method for servicing call establishment requests in a cellular telephone system on a priority basis. According to one aspect of the present invention, a base station receives a call establishment request broadcasted by a mobile unit associated with a first subscriber. Both the base station and the mobile unit are located in a cell of the cellular telephone system.

The base station determines whether it has a free channel to service the call establishment request. If the base station does not have a free channel to service the call establishment request, then a call processor determines a service priority level of the first subscriber.

This service priority level is communicated to the base station. The base station processes the call establishment request in accordance with the service priority level of the first subscriber and service priority levels of second subscribers that are involved in telephone calls active in the cell.

In particular, the base station determines whether any of the second subscribers has a service priority level sufficiently less than the service priority level of the first subscriber. If at least one of the second subscribers has a service priority level sufficiently less than the service priority level of the first subscriber, then the base station terminates the telephone call involving this second subscriber. Then, the base station services the call establishment request using the channel formerly being used to service the terminated telephone call.

Further aspects, features, and advantages of the present invention, as well as the structure and operation of various embodiments of the present invention, are described in detail below with reference to the accompanying drawings.

In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
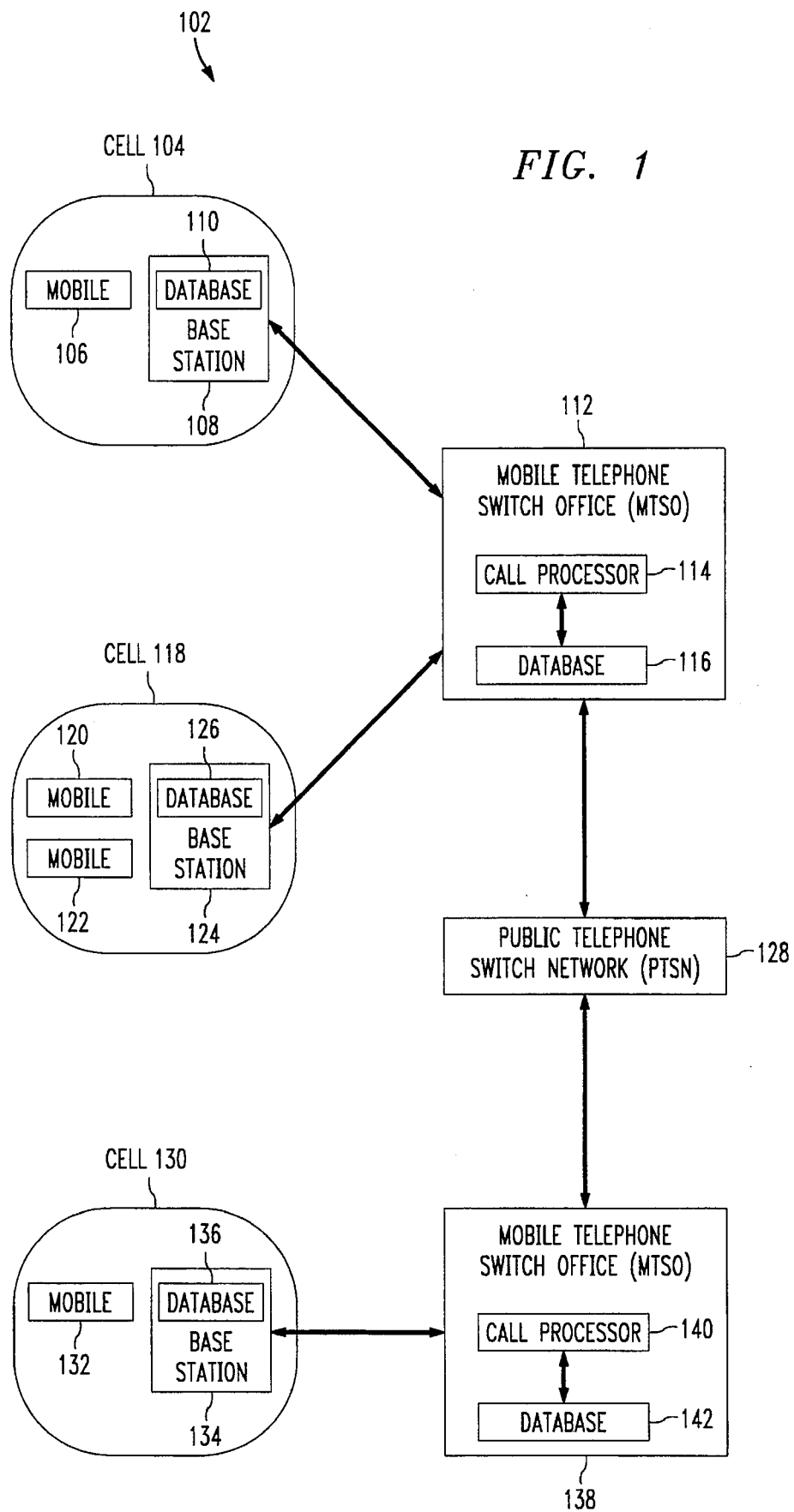
FIG. 1 is a block diagram of a telephone system according to a preferred embodiment of the present invention.

The present invention is directed to a cellular telephone system that supports the prioritization of telephone call requests. A rate-based service priority level is associated with each subscriber (each subscriber elects which priority level he/she wishes to have). During times of peak demand, telephone call requests issued by subscribers are serviced in accordance with the subscribers service priority levels. Subscribers having higher service priority levels are billed at higher rates than subscribers having lower service priority levels.

When cellular network traffic demand exceeds a cellular telephone system's capacity, the present invention automatically determines which call requests to service based on the service priority level associated with the subscribers that issued the call requests. According to the present invention, established lower-priority phone calls are dropped in favor of servicing higher priority calls.

More particularly, the present invention is directed to a preferably software controlled call processor that prioritizes call traffic on a cellular network and provides billing information accordingly. Cellular call "taking" (establishing a call from either the public telephone network or a first mobile cellular phone to a second mobile cellular phone) and call "making" (establishing a call from a mobile cellular phone) are prioritized.

The present invention preferably supports the following service priority levels, although other service priority levels may alternatively be supported.

(1) Priority Service—For a special higher service fee (the most expensive rate), these customers receive priority calling service to make or receive calls despite excess demand in the cellular network. If lower priority customer calls (Basic or Economy) occupy the facilities, these lower priority calls are automatically dropped to serve the Priority customers.

(2) Premium Service—For the second most expensive service rate, these customers receive service where their calls are not dropped to serve Priority Service Customers. Also, if lower priority customer calls (Economy) occupy the facilities, these lower priority calls are dropped automatically to serve the Premium customers.

(3) Normal Service—For the regular service rate (third most expensive rate), these customers receive service with a normal priority. Priority and Premium Service customers do not displace the established calls of Normal Service customers. However, Normal Service customers receive a lower priority in establishing a call. That is, this level of service does not displace lower priority calls (Basic or Economy).

(4) Basic Service—For a reduced service rate (the fourth highest rate), these customers receive service with a low priority which allows their calls to be dropped to serve Priority Customers.

(5) Economy Service—For an even lower service rate (the most inexpensive rate), these customers receive service with a low priority which allows their calls to be dropped to serve both Priority and Premium Customers.

FIG. 1 is a block diagram of a telephone communication system 102 according to a preferred embodiment of the present invention. The telephone communication system 102 includes a public telephone switch network (PTSN) and a plurality of cellular telephone cells 104, 118, 130. At any time, zero or more mobile cellular telephones (also called "mobiles" or "mobile units") may be located in the cells 104, 118, 130, such as mobile 106 which is located in cell 104.

Each cell 104, 118, 130 includes a base station, such as base station 108 in cell 104. Each base station, such as base station 108, includes a database 110. This database 110 includes a list (or table) having an entry for each of the telephone calls which are currently active in the cell 104. The entries store information that identifies the service levels (also called level-of-services) respectively associated with the mobiles in the cell 104 that are involved in the active telephone calls.

The cells 104, 118, 130 are connected to the PTSN 128 via mobile telephone switch offices (MTSO) 112, 138. One or more cells 104, 118, 130 may be associated with each of the MTSOs 112, 138. According to the present invention, each MTSO 112, 138 includes a call processor and a database, such as call processor 114 and database 116 in MTSO 112. Preferably, the call processor 114 is a processor operating in accordance with control logic, such as computer software. Alternatively, the call processor 114 is a primarily hardware state machine.

The database 116 includes a list or table that includes an entry for each mobile 106, 120, 122 contained in the cells 104, 118 with which it is associated. The entries store information that identifies the service levels (also called service priority levels and level-of-services) for these mobiles 106, 120, 122.

The general structure and operation of the mobiles 106, 120, 122, 132, the base stations 108, 124, 134, the MTSOs 112, 138, and the PTSN 128 are well known. Accordingly, the description presented herein focuses on the features of these units which support the prioritization of telephone call requests according to the present invention.

Figure 2:
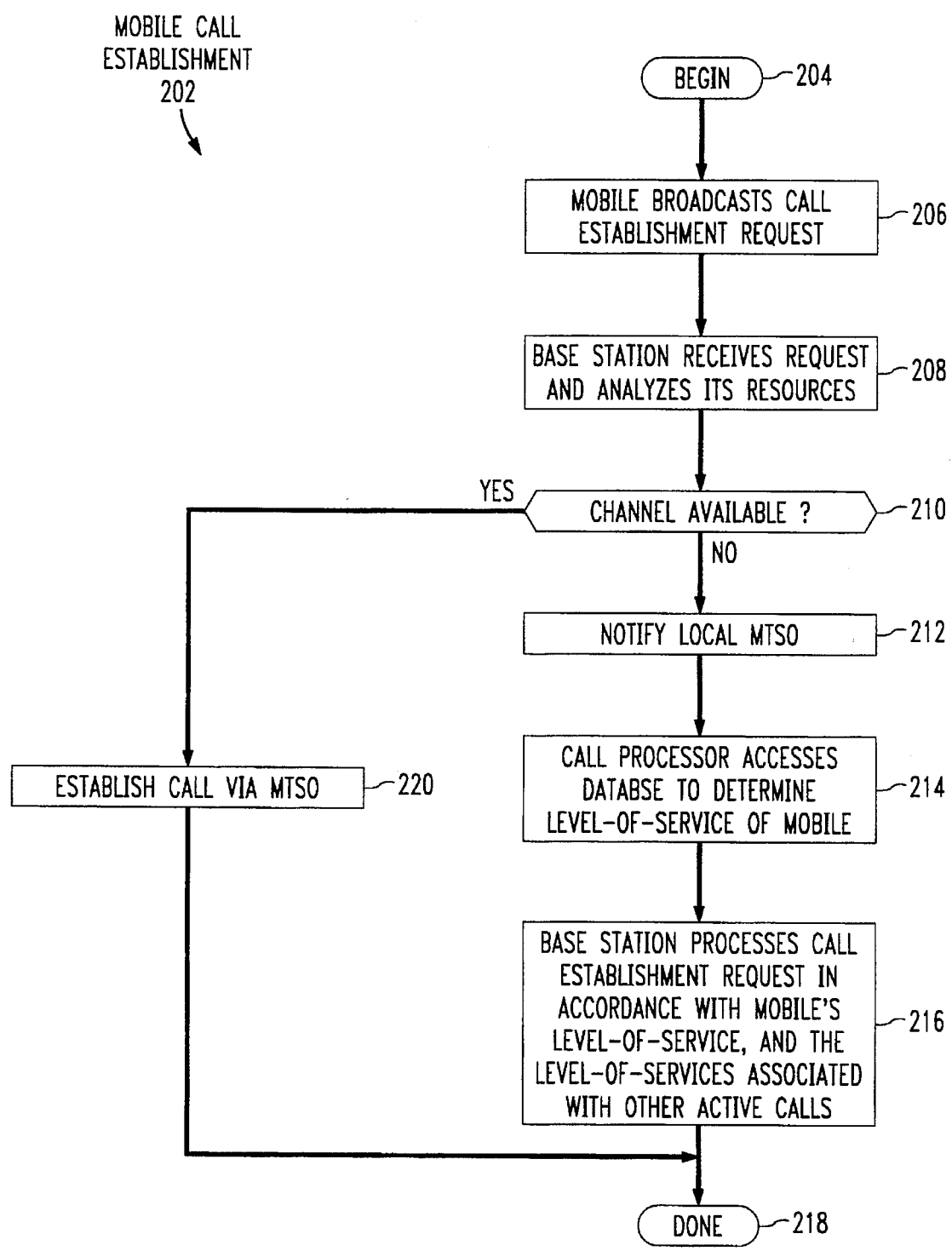
FIGS. 2–4 are flowcharts representing the preferred operation of the present invention.

FIG. 2 is a flowchart 202 depicting the manner in which a mobile establishes a telephone call to a public network subscriber according to a preferred embodiment of the present invention. For illustrative purposes, flowchart 202 is described with respect to mobile 106 located in cell 104. Flowchart 202 begins with step 204, where control immediately passes to step 206.

In step 206, the mobile 106 broadcasts a call establishment request to establish a call with a particular public network subscriber.

In step 208, the base station 108 located in cell 104 receives this call establishment request. As will be appreciated, each base station 108 has a finite number of channels over which telephone calls may be established. Generally, one telephone call may be established for each channel. In step 208, the base station 108 analyzes its resources to determine whether it has a free channel to service the call establishment request.

As indicated by decision step 210, if the base station 108 has a free channel to service the call establishment request, then step 220 is performed. In step 220, a call is established between the mobile 106 and the public network subscriber in a well known manner. Operation of the flowchart 202 is complete after step 220 is performed, as indicated by step 218.

If the base station 108 does not have a free channel to service the call establishment request, then step 212 is performed. In step 212, the base station 108 notifies its MTSO 112 that it does not have sufficient capacity to service the call establishment request.

In step 214, the call processor 114 in the MTSO 112 accesses the database 116 to determine the service priority level of the mobile 106. The call processor 114 transmits this information to the base station 108.

In step 216, the base station 108 processes the call establishment request in accordance with the mobile 106's service priority level, and the service priority levels associated with all active calls in the cell 104. For example, if the service priority level of the mobile 106 is "Priority Service", then the base station 108 accesses its database 110 to determine whether there are any active calls associated with Basic or Economy subscribers. If there is an active call associated with a Basic or an Economy subscriber, then the base station 108 drops that active call, and then establishes the call for the mobile 106 using the channel that was associated with the call that was just dropped.

If, instead, the service priority level of the mobile 106 is "Premium Service", then the base station 108 accesses its database 110 to determine whether there are any active calls associated with Economy subscribers. If there is an active call associated with an Economy subscriber, then the base station 108 drops that active call, and then establishes the call for the mobile 106 using the channel that was associated with the call that was just dropped.

If the call is established, then a message to this effect is sent to the MTSO 112 so that the MTSO 112 can update its billing records.

If, instead, the service priority level of the mobile 106 is "Normal Service," "Basic Service," or "Economy Service," then the base station 108 does not service the call establishment request. In this case, a message is sent back to the mobile 106 notifying the mobile 106 that service capacity has been reached, and that the call establishment request could not be serviced.

Whenever an active call is dropped, the base station 108 notifies the parties that the call is being dropped, and also sends a message to the MTSO 112 so that information pertaining to service fees can be updated accordingly.

Operation of the flowchart 202 is complete after step 216 is performed, as indicated by step 218.

Figure 3:
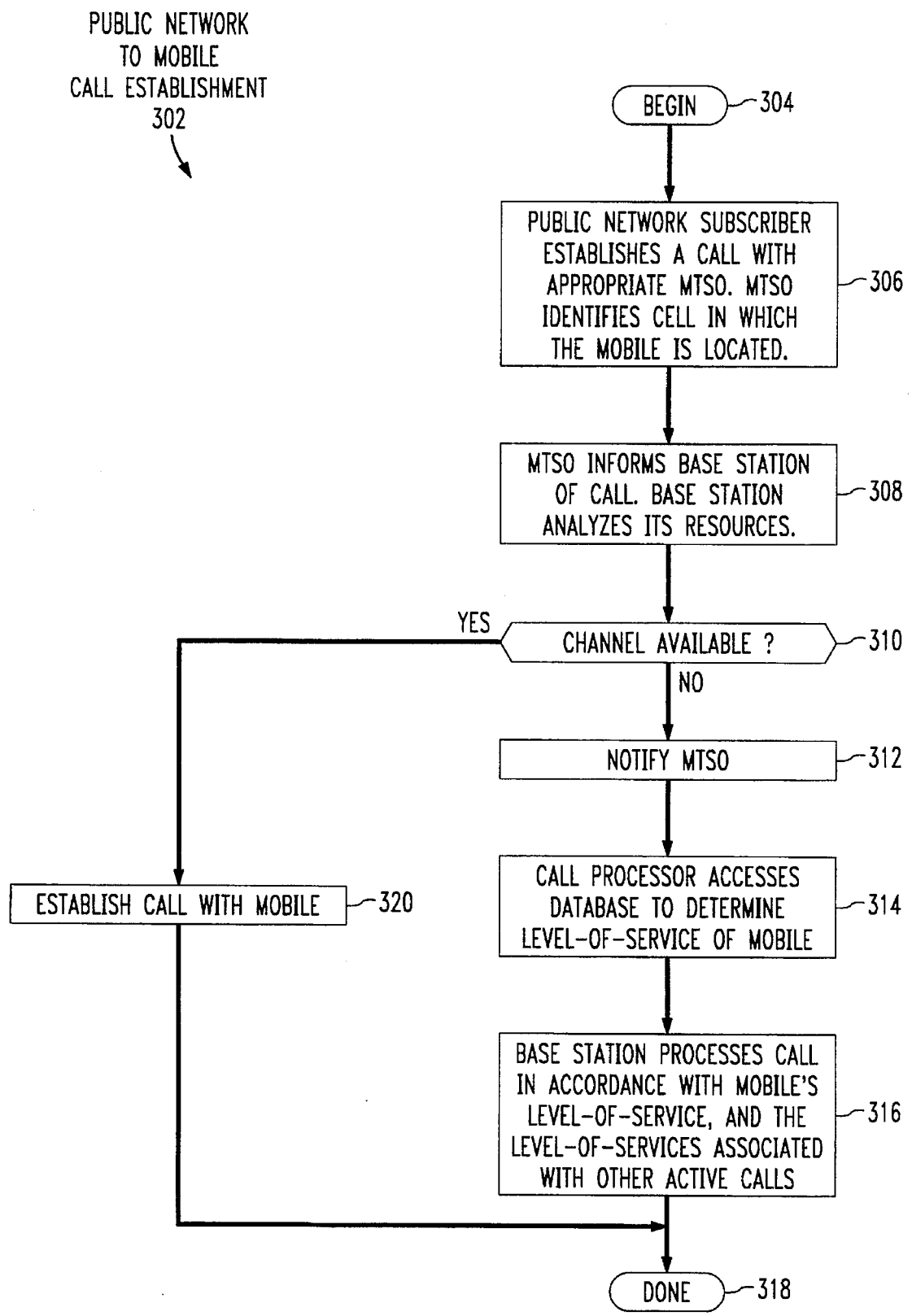

FIG. 3 is a flowchart 302 depicting the manner in which a public network subscriber establishes a telephone call with a mobile according to a preferred embodiment of the present invention. For illustrative purposes, flowchart 302 is described with respect to mobile 106 located in cell 104. Flowchart 302 begins with step 304, where control immediately passes to step 306.

In step 306, the public network subscriber establishes a call with the appropriate MTSO in a well known manner. The "appropriate MTSO" is the MTSO which is associated with the cell in which the mobile 106 is contained, which in this case is the MTSO 112. Also in step 306, the MTSO 112 identifies in a well known manner the cell (in this case, cell 104) in which the mobile 106 is contained.

In step 308, the MTSO 112 identifies the base station 108 of the call. The base station 108 analyzes its resources to determine whether it has a free channel to service the call.

As indicated by decision step 310, if the base station 108 has a free channel to service the call, then step 320 is performed. In step 320, the call is serviced using a free channel in a well known manner. Operation of the flowchart 302 is complete after step 320 is performed, as indicated by step 318.

If the base station 108 does not have a free channel to service the call, then step 312 is performed. In step 312, the base station 108 notifies its MTSO 112 that it does not have sufficient capacity to service the call.

In step 314, the call processor 114 in the MTSO 112 accesses the database 116 to determine the service priority level of the mobile 106. The call processor 114 transmits this information to the base station 108.

In step 316, the base station 108 conditionally processes the call in accordance with the mobile 106's service priority level, and the service priority levels associated with all active calls in the cell 104. The operation of step 316 is similar to step 216 in FIG. 2, described above. If the service priority levels of the mobile 106 and the subscribers associated with the active calls in the cell 104 are such that the call involving the mobile 106 cannot be serviced, then a message reporting this is sent back to the public network subscriber. If, instead, the call is established, then a message to this effect is sent to the MTSO 112 so that the MTSO 112 can update its billing records. Operation of the flowchart 302 is complete after step 316 is performed, as indicated by step 318.

Figure 4:
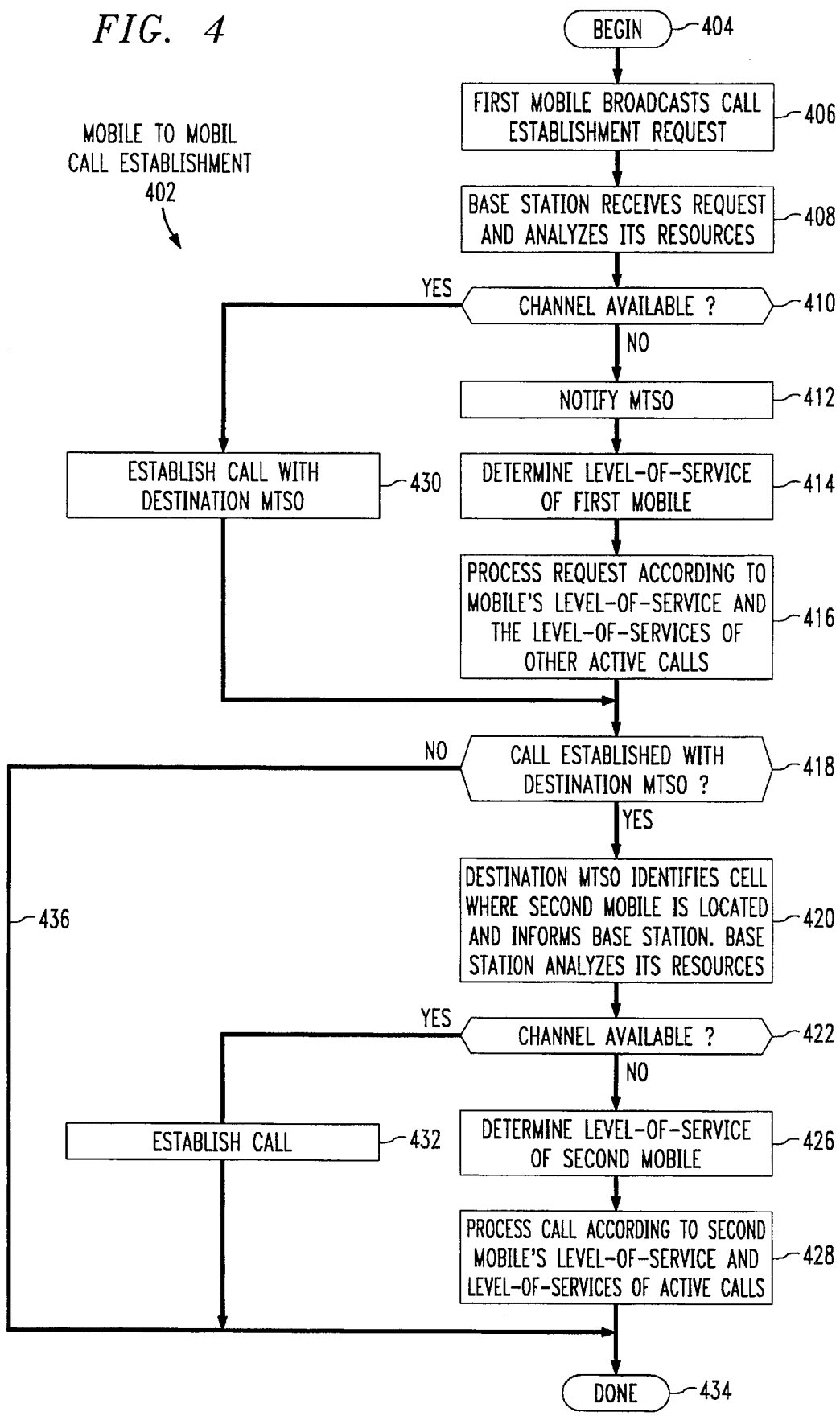

FIG. 4 is a flowchart 402 depicting the manner in which a mobile establishes a telephone call to another mobile according to a preferred embodiment of the present invention (in this case where the call involves two mobiles, the service fees charged to each mobile is based on their respective priority service levels). For illustrative purposes, flowchart 402 is described with respect to mobile 106 located in cell 104 and mobile 120 in cell 118. Flowchart 402 begins with step 404, where control immediately passes to step 406.

In step 406, the mobile 106 broadcasts a call establishment request to establish a call with the mobile 120.

In step 408, the base station 108 located in cell 104 receives this call establishment request. The base station 108 analyzes its resources to determine whether it has a free channel to service the call establishment request.

As indicated by decision step 410, if the base station 108 has a free channel to service the call establishment request, then step 430 is performed. In step 430, a call is established between the mobile 106 and the destination MTSO using a free channel associated with the base station 108. The destination MTSO is the MTSO associated with the cell (i.e., cell 118) in which the destination mobile (i.e., mobile 120) is located.

If the base station 108 does not have a free channel to service the call establishment request, then step 412 is performed. In step 412, the base station 108 notifies its MTSO 112 that it does not have sufficient capacity to service the call establishment request.

In step 414, the call processor 114 in the MTSO 112 accesses the database 116 to determine the service priority level of the mobile 106. The call processor 114 transmits this information to the base station 108.

In step 416, the base station 108 processes the call establishment request in accordance with the mobile 106's service priority level, and the service priority levels associated with all active calls in the cell 104. The operation of step 416 is similar to step 216 in FIG. 2, described above. If the service priority levels of the mobile 106 and the subscribers associated with the active calls in the cell 104 are such that the call involving the mobile 106 cannot be serviced, then a message is sent back to the mobile 106 notifying the mobile 106 that service capacity has been reached, and that the call establishment request could not be serviced.

Processing to establish a call between mobiles 106 and 120 continues if a call was established between the mobile 106 and the destination MTSO 112 in either steps 430 or 416. This is indicated by decision step 418. If a call was established between the mobile 106 and the destination MTSO 112 in either steps 430 or 416, then step 420 is performed. If a call was not established, then operation of flowchart 402 is complete, as indicated by step 434 (path 436).

In step 420, the destination MTSO 112 identifies in a well known manner the cell (in this case, cell 118) in which the destination mobile 120 is contained. The MTSO 112 identifies the base station 124 in cell 118 of the call. The base station 124 analyzes its resources to determine whether it has a free channel to service the call.

As indicated by decision step 422, if the base station 124 has a free channel to service the call, then step 432 is performed. In step 432, the call is serviced using a free channel in a well known manner. Operation of the flowchart 402 is complete after step 432 is performed, as indicated by step 434.

If the base station 124 does not have a free channel to service the call, then step 426 is performed. In step 426, the base station 124 notifies its MTSO 112 that it does not have sufficient capacity to service the call. The call processor 114 in the MTSO 112 accesses the database 116 to determine the service priority level of the destination mobile 120. The call processor 114 transmits this information to the base station 124.

In step 428, the base station 124 conditionally processes the call in accordance with the mobile 120's service priority level, and the service priority levels associated with all active calls in the cell 118. The operation of step 428 is similar to step 216 in FIG. 2, described above (except in this case, the analysis is conducted with respect to the mobile 120's service priority level, and the service priority levels associated with all active calls in the cell 118). If the service priority levels of the mobile 120 and the subscribers associated with the active calls in the cell 118 are such that the call involving the mobile 120 cannot be serviced, then a message reporting this is sent back to the MTSO 112 and the mobile 106 in the cell 104. If, instead, the call is established, then a message to this effect is sent to the MTSO 112 so that the MTSO 112 can update its billing records. Operation of the flowchart 402 is complete after step 428 is performed, as indicated by step 434.

Thus, as is clear from the above, whether or not a call between two mobile units will be established depends on the priority service levels associated with each mobile, and the priority service levels associated with subscribers involved in telephone calls active in the cells in which the two mobiles are contained. Generally, the overall priority of the two mobiles is limited by the lowest priority of the two. For example, if one mobile has a priority of Premium, and the other has a priority of Economy, then with all else being equal, whether or not the call will be established will be governed by the Economy level (of course, the priority service levels associated with subscribers involved in telephone calls active in the cells in which the two mobiles are contained must be considered).

In order to allow customers the ability to vary their access capability and the cost of their calls, as users they can enter special control sequences (for example, by using the asterisk and the pound keys) to upgrade or downgrade their priority level for a special "per-use" fee that applies to that one telephone call. This higher "per-use" fee allows Basic or Economy customers the ability to make special priority calls if they are blocked or dropped and are willing to pay more to gain access to the network during peak demand times.

Other Service Priority Levels

As discussed above, the present invention preferably supports five service priority levels: Priority Service, Premium Service, Normal Service, Basic Service, and Economy Service. However, the present invention is intended and adapted to support other priority levels (either in addition to or instead above the five priority levels just listed). In one embodiment, the present invention supports a sixth priority level in addition to the above. This sixth priority level is called "Emergency Service," and it is the highest priority level (i.e., higher than Priority Service). The Emergency Service priority level is designated for federal, state, and/or local emergency services personnel or critical government functions. These designated customers receive the highest priority service to make or receive calls despite excess demand in the cellular network. If lower priority customer calls (Basic or Economy) occupy the facilities, these lower priority calls are automatically dropped to serve the Emergency Service customers. Also, during times designated by the cellular service provider as an "emergency condition," such as a weather or natural catastrophe, or a civil emergency, these Emergency Customers preempt calls of any of the lower priority customers (Priority, Premium, Normal, Basic, or Economy).

Prioritized Hand-Off

According to one embodiment, the present invention supports prioritized hand-off. "Hand-off" is a well known term that refers to the process that occurs when a mobile with an active call moves from one cell to another cell in the cellular network. According to the present invention, as an active call is passed from a first cell (called "the old cell") to a second cell (called "the new cell"), the scarce resources of the new cell are monitored to determine if there is enough capacity to support the call. If so, any lower priority calls already established in the new cell are not disturbed and the higher priority call is passed (handed off) from the old cell to the new cell in a well known manner. If, instead, there is not enough capacity in the new cell, a lower priority call in the new cell is dropped to allow the higher priority call to be handed off into the new cell. On mobile-to-mobile calls, this process is governed by the priority level associated with the subscriber moving from the old cell to the new cell. Alternatively, this process is governed by the higher priority level of the two mobiles involved in the call that is moving from the old cell to the new cell.

Benefits of the Present Invention

Because the capacity of cellular mobile phone networks is fixed, access to placing or receiving a telephone call is a scarce resource that cannot always be expanded in a cost effective manner. Prioritization allows a service fee based allocation method to service the demand. Many customers are willing to pay higher subscription rates for "guaranteed" cellular service, which could be provided only by a prioritized network. It is possible that more customers would subscribe for service if rates were lower, but without prioritization, the network might not be able to handle the increased traffic demand without unacceptable call blocking rates.

Prioritization would also allow government designated emergency services (such as police, fire, or ambulance) or critical government agencies (such as security) prioritized access to make and take calls in the cellular network. This is the Emergency Service level discussed above. During natural catastrophes or public emergencies, when telephone networks are capacity stressed the most, the cellular service provider can establish a "designated emergency" to allow these governmental agencies prioritized service over all other classes of service. Under normal service conditions, these users only displace the lower classes of service (Basic and Economy).

The division of subscribers into service levels according to the present invention allows a cellular service provider to purposely "over-subscribe" the network (i.e., put more paying customers onto it than it could normally handle during peak demand) while still providing low blocking rates to the higher priority customers. The lower priority customers receive cellular service at a lower fee than would be possible if the network were engineered to handle the peak calling demand for the entire subscriber base.

In different cellular markets there are different expectations about the level of service. Prioritization according to the present invention makes it possible to meet these conflicting expectations and restrains at the same time. In some cellular markets, low access price is of paramount important or is mandated by governmental authority. For these cellular providers, the ability to purposely oversubscribe the network lowers the installation costs, while prioritization still allows customers willing to pay a higher price access to a virtual network with a lower blocking rate. In other markets, the added convenience of very low blocking rates justifies demanding a higher fee for an improved level of service, allowing the service provider to differentiate the offered product line.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of servicing call establishment requests in a cellular telephone system, comprising the steps of:

(1) receiving at a base station a call establishment request broadcasted by a mobile unit associated with a first subscriber, said base station and said mobile unit both located in a cell of a cellular telephone system;

(2) determining whether said base station has a free channel to service said call establishment request;

(3) if said base station does not have a free channel to service said call establishment request, then determining a service priority level of said first subscriber; and (4) processing by said base station said call establishment request in accordance with said service priority level of said first subscriber and service priority levels of second subscribers involved in telephone calls active in said cell.

2. The method of claim 1, wherein step (4) comprises the steps of:

determining whether any of said second subscribers has a service priority level sufficiently less than said service priority level of said first subscriber;

if at least one of said second subscribers has a service priority level sufficiently less than said service priority level of said first subscriber, then terminating a telephone call involving said at least one of said second subscribers; and servicing said call establishment request using a channel formerly being used to service said terminated telephone call.

3. The method of claim 1, wherein said first subscriber may modify said service priority level on a per call basis.

4. A method of servicing call establishment requests in a cellular telephone system, comprising the steps of:

(1) receiving a call from a PTSN (public telephone switch network) subscriber to a mobile unit located in a cell of the cellular telephone system;

(2) determining whether a base station contained in said cell has a free channel to service said call;

(3) if said base station does not have a free channel to service said call, then determining a service priority level of a subscriber associated with said mobile unit; and (4) processing said call in accordance with said service priority level and with service priority levels of additional mobile subscribers involved in telephone calls active in said cell.

5. The method of claim 4, wherein step (4) comprises the steps of:

if said base station does not have a free channel to service said call, then determining whether any of said additional mobile subscribers involved in telephone calls active in said cell has a service priority level sufficiently less than said service priority level of said subscriber;

if at least one of said additional mobile subscribers involved in telephone calls active in said cell has a service priority level sufficiently less than said service priority level of said subscriber, then terminating a telephone call involving said at least one of said additional mobile subscribers; and servicing said call using a channel formerly being used to service said terminated telephone call.

6. A method of servicing call establishment requests in a cellular telephone system, comprising the steps of:

(1) receiving at a first base station a call establishment request to establish a telephone call between a first mobile unit located in a first cell and a second mobile unit located in a second cell, said call establishment request including a service priority based on subscriber specific criteria, said first base station also located in said first cell;

(2) determining whether said first base station has a free channel to service said call establishment request;

(3) if said first base station does not have a free channel to service said call establishment request, then determining a first service priority level of said first subscriber; and (4) determining whether any third subscribers involved in telephone calls active in said first cell has a service priority level sufficiently less than said first service priority level of said first subscriber;

(5) if at least one of said third subscribers in said first cell has a service priority level sufficiently less than said first service priority level of said first subscriber, then terminating a telephone call involving said at least one of said third subscribers; and (6) servicing said call establishment request in said first cell by using a channel formerly being used to service said terminated telephone call to establish a call between said first mobile unit and a mobile telephone switch office (MTSO) associated with said second cell.

7. The method of claim 6, further comprising the steps of:

(7) determining whether said second base station has a free channel to service said call establishment request to said second mobile unit in said second cell;

(8) if said second base station does not have a free channel to service said call establishment request, then determining a second service priority level of said second subscriber;

(9) determining whether any fourth subscribers involved in telephone calls active in said second cell has a service priority level sufficiently less than said second service priority level of said second subscriber;

(10) if at least one of said fourth subscribers has a service priority level sufficiently less than said second service priority level of said second subscriber, then terminating a second telephone call involving said at least one of said fourth subscribers; and

(11) servicing said call establishment request by using a channel formerly being used to service said terminated second telephone call to establish a call between said MTSO and said second mobile.

8. The method of claim 6, wherein said first subscriber may modify said first service priority level on a per call basis.

9. A cellular telephone system, comprising:

means for receiving a call establishment request broadcasted by a mobile unit associated with a first subscriber, said call establishment request including a service priority based on subscriber specific criteria, said mobile unit located in a cell of said cellular telephone system;

means for determining whether a free channel to service said call establishment request exists;

means for determining whether a free channel to service said call establishment request exists;

means for determining a service priority level of said first subscriber if a free channel to service said call establishment request does not exist; and processing means for processing said call establishment request in accordance with said service priority level of said first subscriber and service priority levels of second subscribers involved in telephone calls active in said cell.

10. The cellular telephone system of claim 9, wherein said processing means comprises:

means for determining whether any of said second subscribers has a service priority level sufficiently less than said service priority level of said first subscriber;

means for terminating a telephone call involving one of said second subscribers if said one of said second subscribers has a service priority level sufficiently less than said service priority level of said first subscriber; and means for servicing said call establishment request using a channel formerly being used to service said terminated telephone call.

11. The cellular telephone system of claim 9, further comprising means for enabling said first subscriber to modify said first priority level on a per call basis.

* * * * *